United States Patent [19]

Servilio et al.

[11] Patent Number: 5,670,951
[45] Date of Patent: Sep. 23, 1997

[54] RADIO COMMUNICATION DEVICE AND METHOD FOR GENERATING THRESHOLD LEVELS IN A RADIO COMMUNICATION DEVICE FOR RECEIVING FOUR-LEVEL SIGNALS

[75] Inventors: Mark L. Servilio; Carla J. Maroun; Daniel Morera, all of Boynton Beach; Clinton C. Powell, II, Lake Worth, all of Fla.

[73] Assignee: Motorola, Inc., Schaumburg, Ill.

[21] Appl. No.: 503,366

[22] Filed: Jul. 17, 1995

[51] Int. Cl.$^6$ .................... G08B 5/022; H03M 1/10; H03M 1/00; H03M 1/62
[52] U.S. Cl. .................. 340/825.44; 341/120; 341/132; 341/127; 341/139
[58] Field of Search .................... 341/156, 120, 341/127, 139, 132; 340/825.44

[56] References Cited

U.S. PATENT DOCUMENTS

| | | |
|---|---|---|
| 3,537,084 | 10/1970 | Behr . |
| 3,610,894 | 10/1971 | Drury et al. ............ 235/92 NT |
| 3,719,934 | 3/1973 | Behr et al. . |
| 3,736,582 | 5/1973 | Norris . |
| 3,882,489 | 5/1975 | Guggolz .................... 340/347 |
| 4,631,737 | 12/1986 | Davis et al. . |
| 4,866,261 | 9/1989 | Pace . |
| 4,929,851 | 5/1990 | Pace . |
| 5,425,056 | 6/1995 | Maroun et al. ............ 375/316 |

*Primary Examiner*—Michael Horabik
*Assistant Examiner*—Anthony A. Asongwed
*Attorney, Agent, or Firm*—Kelly A. Gardner; John H. Moore

[57] ABSTRACT

A symbol detector (110) includes an analog-to-digital converter (115) for converting signal voltages to digital values and peak and valley counters (310, 315) for tracking the digital values to determine peak and valley values associated with high and low voltages of the signal. The symbol detector (110) further includes calculation circuitry (356) for calculating upper, lower, and center thresholds based on the peak and valley values and a decoder (125) for generating data symbols in accordance with the upper, lower, and center thresholds.

19 Claims, 4 Drawing Sheets

RADIO COMMUNICATION DEVICE AND METHOD FOR GENERATING THRESHOLD LEVELS IN A RADIO COMMUNICATION DEVICE FOR RECEIVING FOUR-LEVEL SIGNALS

FIELD OF THE INVENTION

This invention relates in general to radio communication devices, and more specifically to a radio communication device for receiving four-level signals.

BACKGROUND OF THE INVENTION

Digital communication systems, such as selective call paging systems, have utilized binary digital signalling formats for many years. When such digital signalling formats have been utilized, the digital information has been modulated onto the carrier using modulation techniques such as frequency shift keying (FSK), wherein the digital information is directly modulated onto the carrier. Within the receiver, the frequency shift keyed carrier is demodulated and further processed to provide a stream of digital data. Such modulation and demodulation techniques, while effective at lower data bit rates, such as data bit rates below approximately 6000 bits per second, are not effective at higher data bit rates due to synchronization problems in simulcast systems. As a result, other modulation techniques are required to enable higher data throughput at lower symbol rates.

One such modulation technique which allows higher data throughput at lower symbol rates is a multi-level frequency modulation technique, such as four-level frequency modulation (FM). As compared to conventional frequency shift keyed modulation, four-level FM allows twice the data throughput for a given data symbol rate. In conventional four-level FM receivers, the carrier is received and converted to analog voltages. The analog voltages then are compared to pre-programmed threshold levels to allow a determination of which of four data symbols should be generated for each analog voltage. Although this demodulation technique provides a stream of digital data, the data may not always be recovered accurately because the pre-programmed threshold levels do not allow for variations in the received carrier which result in voltage offsets. As further offsets in the received carrier occur, greater voltage offsets are encountered and incorrect data symbols can be generated, possibly causing erroneous recovery of information from the radio signal.

Thus, what is needed is a method and apparatus, for use with multi-level signalling formats, for dynamically varying the threshold levels utilized for recovery of data symbols in response to variations in the voltage offsets caused by voltage variations in the received carrier.

DESCRIPTION OF A PREFERRED EMBODIMENT

Figure 1:
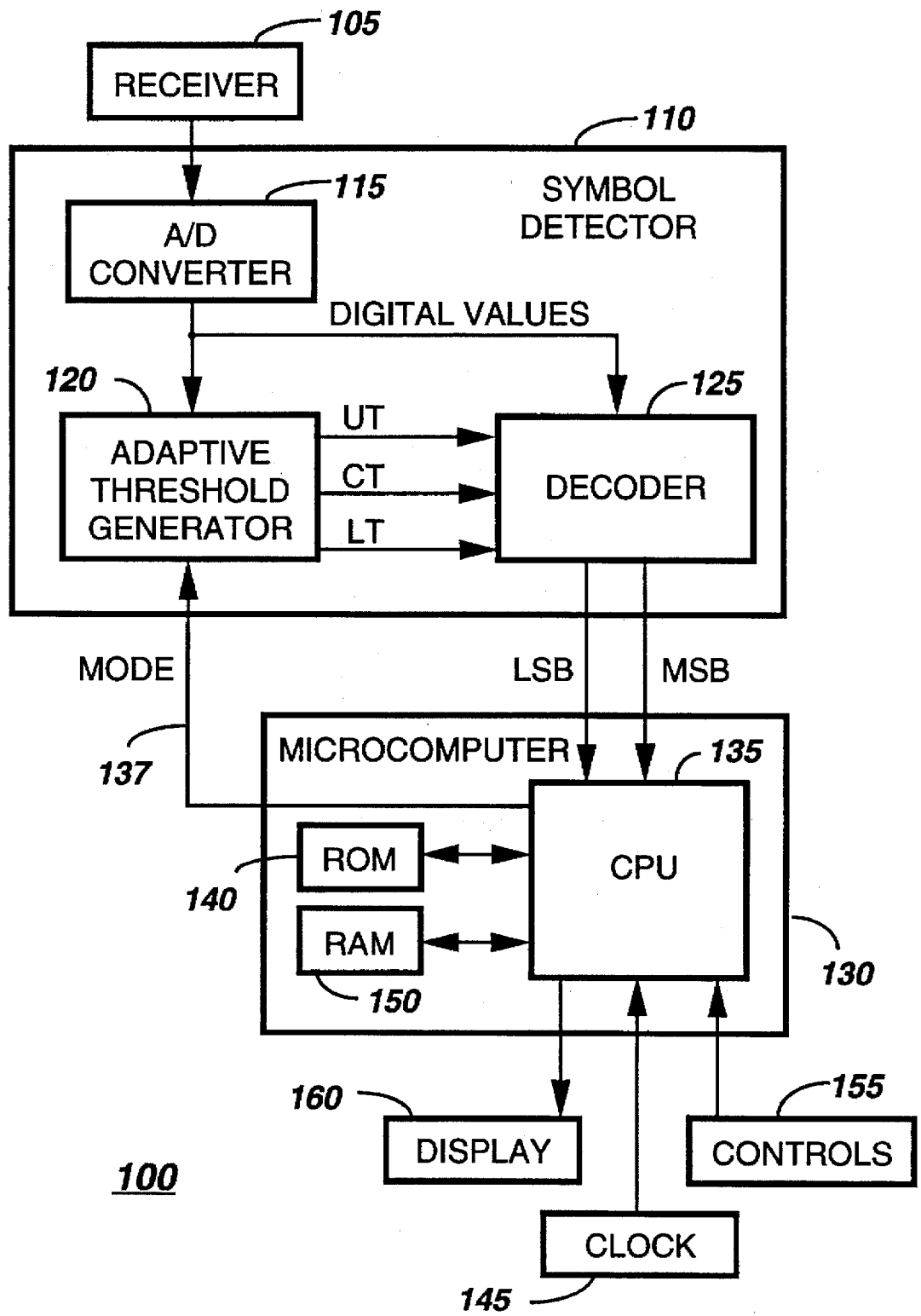
FIG. 1 is an electrical block diagram of a radio communication device for receiving signals transmitted in a four-level signalling format in accordance with the preferred embodiment of the present invention.

FIG. 1 is an electrical block diagram of a radio communication device 100 in accordance with a preferred embodiment of the present invention. The radio communication device 100 comprises a receiver 105 for demodulating and recovering multiple analog signal voltages from a received radio frequency signal transmitted utilizing four-level frequency modulation (FM). The multiple signal voltages are then provided to a symbol detector 110 for translating the analog signal voltages into data symbols, preferably in the form of bit patterns.

The symbol detector 110 comprises an analog-to-digital (A/D) converter 115 for converting the analog signal voltages provided thereto to digital values, which are eight bits in length, therefore ranging from 0 to 255, for an eight-bit analog-to-digital converter. The digital values are coupled to an adaptive threshold generator 120, which, in accordance with the preferred embodiment of the present invention, calculates upper, lower, and center thresholds from the digital values. The symbol detector 110 further comprises a decoder 125 coupled to the adaptive threshold generator 120 and the analog-to-digital converter 115 for generating the data symbols in accordance with the digital values and the upper, lower, and center thresholds, as may be better understood by referring to FIG. 2.

Figure 2:
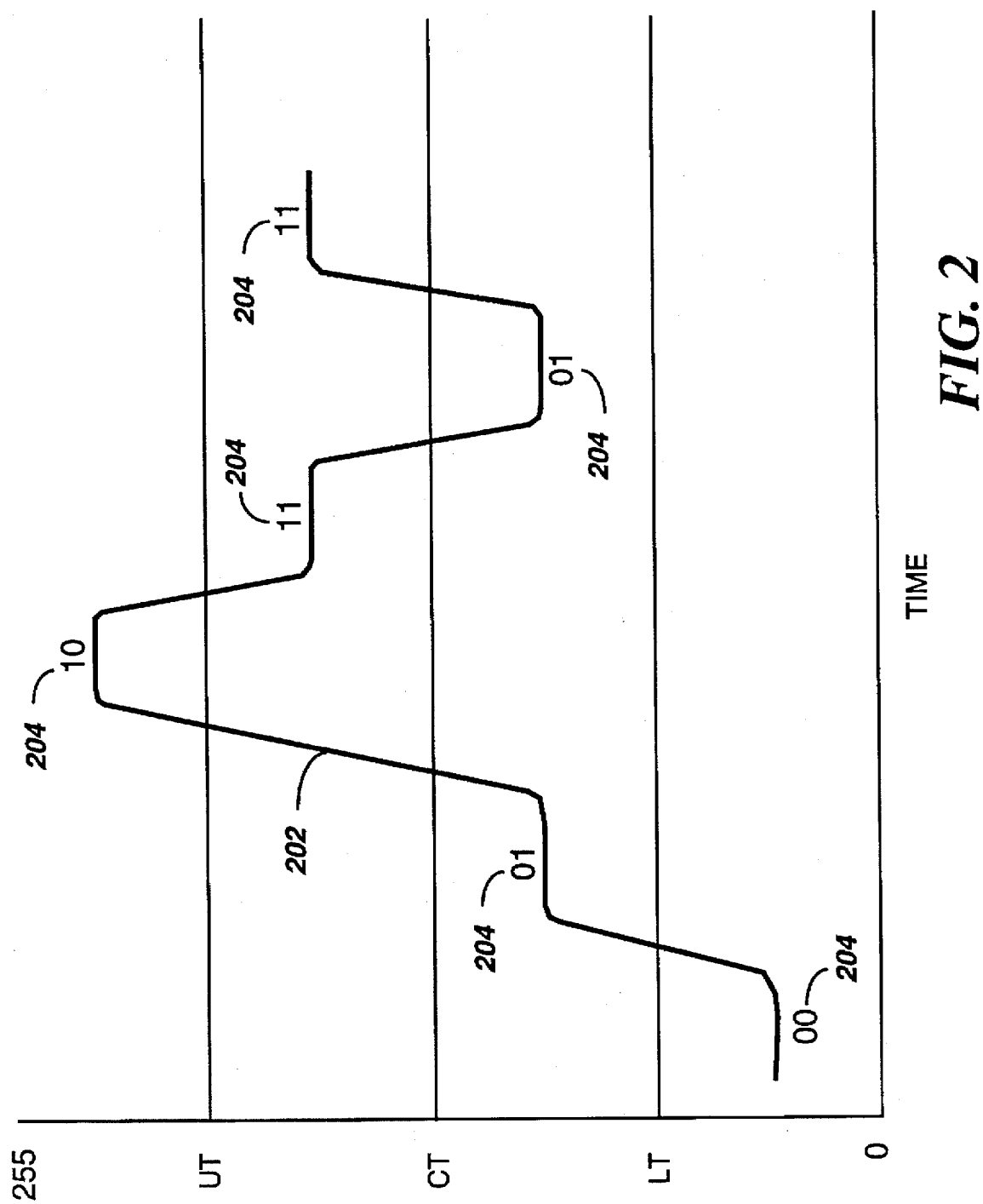
FIG. 2 is an example of a digital waveform comprising digital values corresponding to analog signal voltages of a four-level radio frequency signal in accordance with the preferred embodiment of the present invention.

FIG. 2 is a graph showing an example of a waveform 202 comprising recovered digital values corresponding to analog signal voltages for a four-level radio frequency signal received by the receiver 105. The decoder 125 (FIG. 1) receives the upper, lower, and center thresholds in the form of digital threshold values from the adaptive threshold generator 120. The upper, lower, and center thresholds define four ranges of values that encompass received signal voltages. Additionally, the decoder 125 receives the digital values corresponding to the analog signal voltages. The decoder 125 thereafter determines which of the four ranges encompasses each of the digital values, corresponding to received analog signal voltages, and thereafter generates the appropriate data symbol. In a four-level signalling system, the appropriate data symbol is selected from four possible data symbols. The data symbols, e.g., bit patterns 204, generated for each of the four ranges may be, for example, the following:

| Range | Bit Pattern |
|---|---|
| digital value > upper threshold (UT) | 1-0 |
| center threshold (CT) < digital value < UT | 1-1 |
| lower threshold (LT) < digital value < CT | 0-1 |
| digital value < LT | 0-0 |

Although it will be appreciated that the decoder 125 included in the symbol detector 110 generates the data symbols, e.g., the bit patterns 204, in a conventional manner, the symbol detector 110 yields more accurate results than conventional symbol detectors because the upper, lower, and center thresholds provided to the decoder 125 vary in accordance with the received four-level radio frequency signal, as will be explained in greater detail herein below.

Conversely, in conventional symbol detectors, the upper, lower, and center thresholds are pre-programmed to conform with expected values associated with a received four-level signal and cannot be changed. As a result, if the voltage of the received signal is offset by a greater-than-expected amount, the pre-programmed thresholds can cause the erroneous generation of data symbols.

Returning to FIG. 1, the radio communication device 100 further includes a processor, which is preferably a microcomputer 130, for example, the MC68HC05 manufactured by Motorola, Inc. of Schaumburg, Ill. Alternatively, the processor can be implemented by hard-wired logic capable of performing equivalent operations. The microcomputer 130 comprises a central processing unit (CPU) 135 for controlling the operation of the microcomputer 130 and for controlling the operation of the adaptive threshold generator 120 via a mode control line 137. The CPU 135 transmits signals over the mode control line 137 directing the adaptive threshold generator 120 to reset, track the incoming digital values to dynamically generate the thresholds, or to hold the current thresholds.

The CPU 135 receives and processes the data symbols provided by the symbol detector 110 in accordance with subroutines stored in a read only memory (ROM) 140. Because the data symbols may be inaccurate until after a receiver warm-up time, which is required for stabilization of receiver components, the CPU 135 references time values provided by a clock 145 coupled to the microcomputer 130 before decoding the data symbols to recover information, such as selective call messages, included therein. The information is then stored in a random access memory (RAM) 150, which is typically utilized for temporary storage of data, such as variables and decoded information, derived during operation of the radio communication device 100. When a selective call message is received, the CPU 135 preferably activates, either automatically or in response to signals conveyed by user controls 155, a display 160, which presents the message to a user.

Figure 3:
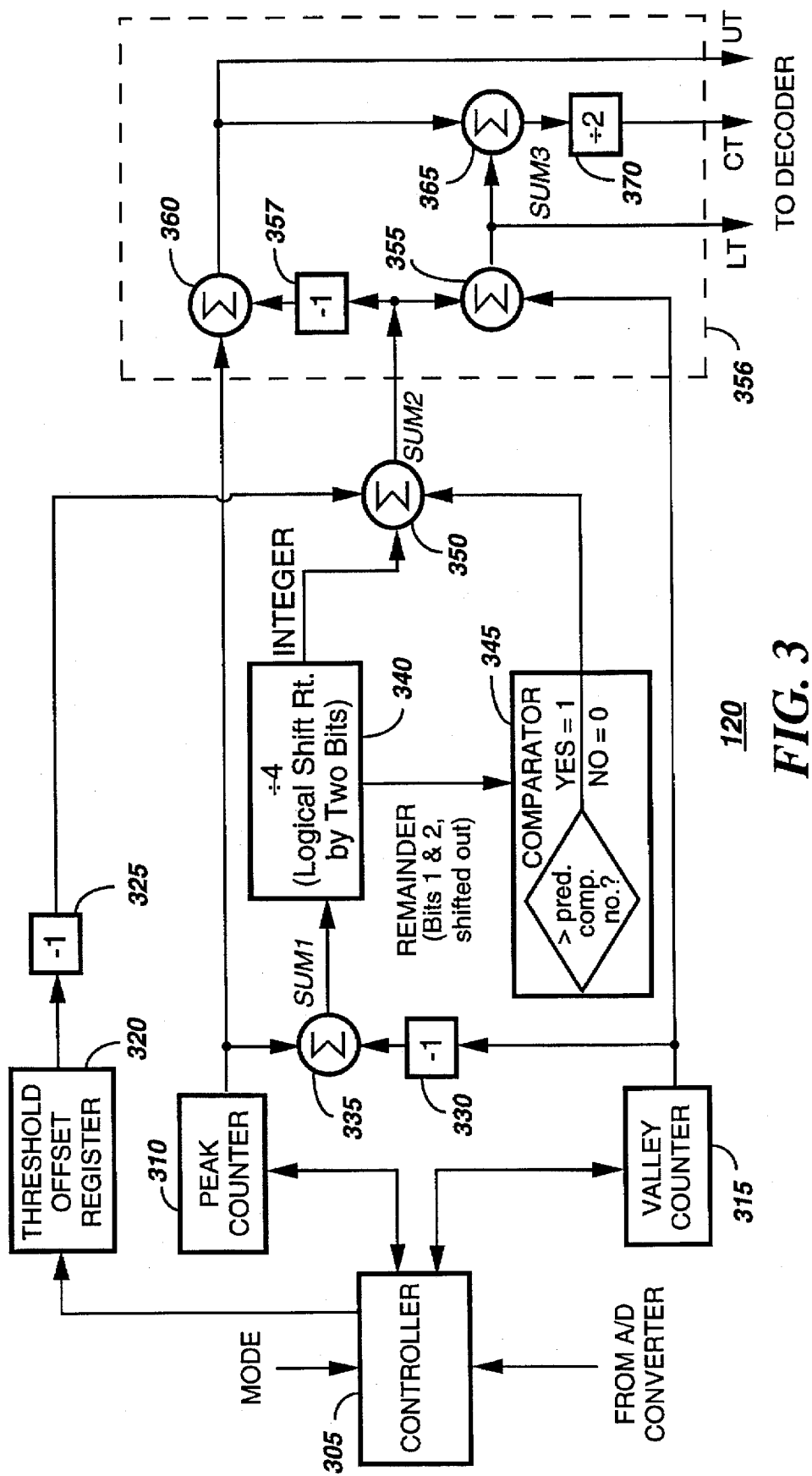
FIG. 3 is an electrical block diagram of an adaptive threshold generator included within the radio communication device of FIG. 1 for generating upper, lower, and center thresholds from the received signals in accordance with the preferred embodiment of the present invention.

Referring next to FIG. 3, a block diagram of the adaptive threshold generator 120 in accordance with the preferred embodiment of the present invention is depicted. The adaptive threshold generator 120 preferably comprises a controller 305 for receiving "reset", "track", and "hold" signals from the CPU 135 and for receiving the digital values from the analog-to-digital converter 115. When set in the "track" mode, the controller 305 increments a peak counter 310, which is initially set to zero, to track the digital values corresponding to the high voltages of the incoming radio frequency signal in a manner well known to one of ordinary skill in the art. A valley counter 315 is decremented by the controller 305 to track the digital values corresponding to the low signal voltages. The valley counter 315 is preferably initially set to its maximum value, which is 255 (1-1-1-1-1-1-1-1) for an eight-bit counter. A threshold offset register 320 is also coupled to the controller 305 for outputting a pre-programmed value, e.g., a predetermined offset value, that is preferably given by the formula:

$$\text{offset} = \frac{P - V}{12},$$

where P represents the value provided by the peak counter 310 and V represents the value provided by the peak counter 315. An offset value given by this formula is preferably utilized when the largest known peak-to-valley difference is approximately two-hundred-eighty (280) millivolts and the best resolution of the A/D converter 115 is approximately four (4) millivolts. Given these parameters, the offset value will generally be a digital value between zero (0) and seven (7) that comprises three bits. A sign inverter 325 coupled to the threshold offset register 320 inverts the sign of the offset value.

Additionally, another sign inverter 330 coupled to the output of the valley counter 315 inverts the sign of the valley value provided thereto. The inverted valley value and the peak value are then digitally added by summer 335 to generate a first sum value, SUM1, which is provided to a divider 340 for digitally dividing SUM1 by four. In other words, the eight bit value provided to the divider 340 is shifted to the right by two. The remainder, e.g., bit numbers one and two that have been shifted out, is provided to a comparator 345 for comparing the remainder to a predetermined comparator number, e.g., one-quarter. When the remainder is greater than the predetermined comparator number, the comparator 345 generates a first predetermined output, such as a high output, i.e., a digital one. Specifically, when the two remainder bits are "10" or "11", the comparator 345 preferably generates a high output. Conversely, when the two remainder bits are "00" or "01", the comparator 345 preferably provides a second predetermined output, preferably a low output, i.e., a digital zero. The integer output of the divider 340, the comparator output, and the inverted offset value provided by sign inverter 325 are then digitally added by a second summer 350 to generate a second sum value, SUM2.

The adaptive threshold generator 120 further comprises calculation circuitry 356 for calculating the upper, lower, and center thresholds in accordance with the second sum value, SUM2. The calculation circuitry 356 of the adaptive threshold generator 120 includes a third sign inverter 357 for inverting the sign of SUM2 and providing the result to a third summer 360. Summer 360 digitally adds the output of sign inverter 357 and the peak value to generate the upper threshold, UT. The output, SUM2, provided by summer 350 is digitally added to the valley value by a fourth summer 355 to generate the lower threshold, LT. A fifth summer 365 is included in the calculation circuitry 356 for digitally adding the upper and lower thresholds to result in a third sum value, SUM3. The third sum value, SUM3, is provided to a divider 370 for dividing the value by two to calculate and generate the center threshold, CT.

It will be appreciated that the center threshold CT may alternatively be generated by summing the peak and valley values, which can then be divided by two to generate the center threshold.

The adaptive threshold generator 120 advantageously generates the upper, lower, and center thresholds from the digital values provided thereto. As the high and low signal voltages corresponding to the digital values change, perhaps signifying voltage offsets in the received signal, the peak and valley values, and thus the upper, lower, and center thresholds, are modified to reflect the voltage changes in the received signal. As a result, the data symbols generated by the decoder 125 remain accurate as the voltage offset of the received signal varies.

Additionally, the use of a threshold offset register 320 conveniently provides for the use of simple, relatively inexpensive divide-by-four logic. The four ranges thereby provided can then be advantageously modified by the offset value generated by the threshold offset register 320. As a result, the adaptive threshold generator 120 can be inexpensively implemented without complex circuitry.

Figure 4:
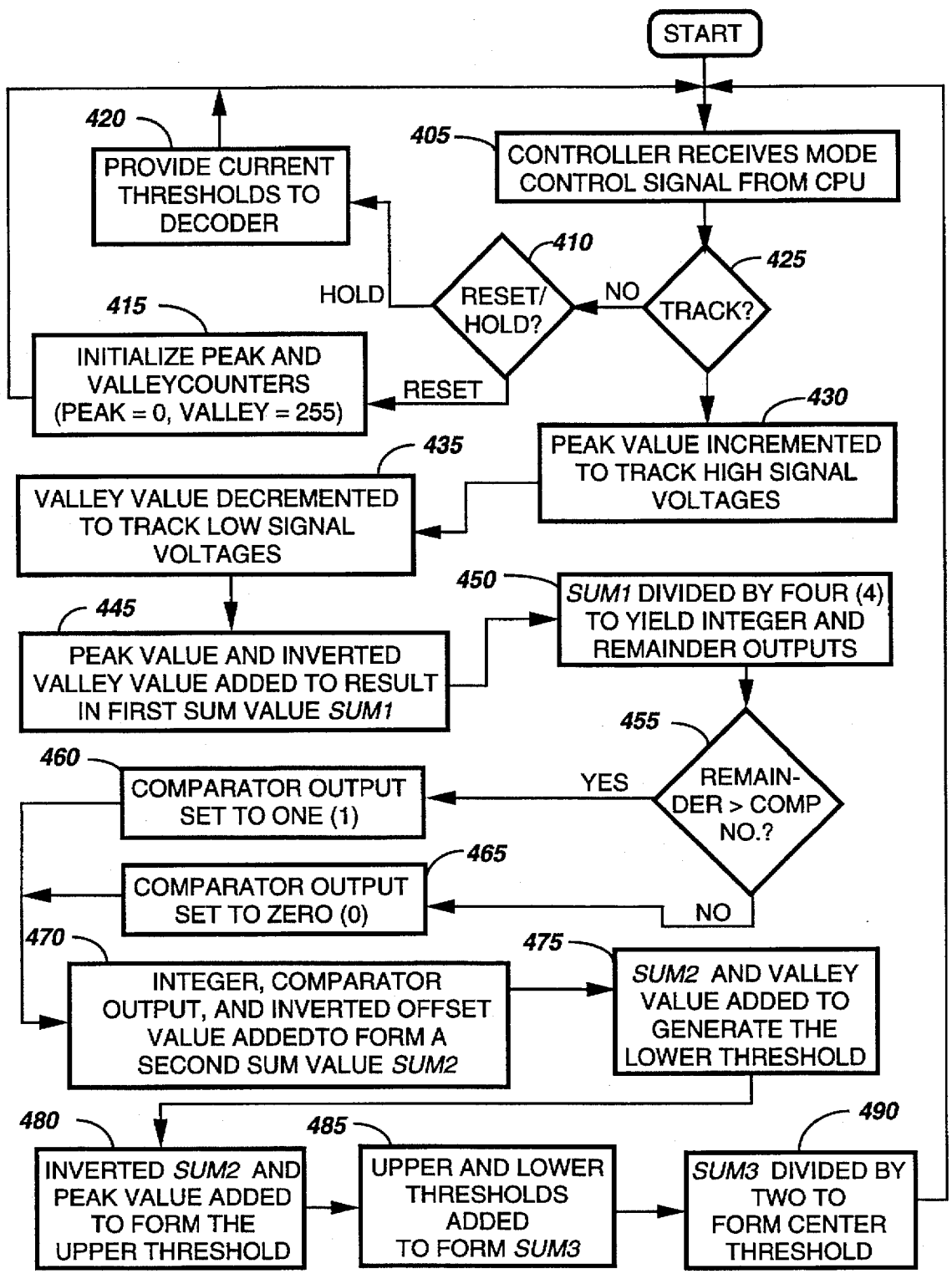
FIG. 4 is a flowchart depicting an operation of the adaptive threshold generator of FIG. 3.

With reference to FIG. 4, a flowchart depicts the operation of the adaptive threshold generator 120. Upon powering up the radio communication device 100, the controller 305

(FIG. 3) receives, at step 405, the mode control signal from the CPU 135 (FIG. 1). When the controller 305 is set thereby in the "reset" mode, at step 410, the peak and valley counters 310, 315 are re-initialized, i.e., peak value=zero and valley value=maximum value, at step 415. When the controller 305 is set, at step 410, in the "hold" mode, upper, lower, and center thresholds continue to be generated, at step 420, from values currently stored by the peak and valley counters 310, 315.

When, at step 425, the controller 305 is set in the "track" mode, the peak value stored in the peak counter 310 is incremented, at step 430, to track the digital values corresponding to the high signal voltages, and the valley value set in the valley counter 315 is decremented, at step 435, to track the digital values corresponding to the low signal voltages.

The peak value and the inverted valley value are, at step 445, digitally added to result in the first sum value, SUM1, which is divided, at step 450, by four to result in integer and remainder outputs from the divider 340. When, at step 455, the remainder output is greater than the predetermined comparator number, the comparator output is set to one, at step 460. Conversely, when the remainder output is not greater than the predetermined comparator number, the comparator output is set to zero, at step 465. The integer output, comparator output, and inverted offset value are then added, at step 470, by summer 350 to result in the second sum value, SUM2.

The second sum value, SUM2, and the valley value are added, at step 475, to generate the lower threshold LT, while the peak value and the inverted second sum value, -SUM2, are added, at step 480, to generate the upper threshold UT. The center threshold CT is then generated. This can be accomplished, for example, by adding the upper and lower thresholds to form a third sum value, SUM3, at step 485, and then dividing the third sum value, SUM3, by two, at step 490.

In summary, the symbol detector in accordance with the preferred embodiment of the present invention translates analog signal voltages to data symbols utilizing an adaptive threshold generator. The adaptive threshold generator determines peak and valley values associated with high and low signal voltages, respectively, and calculates therefrom upper, lower, and center thresholds for transmission to a decoder, which generates the data symbols provided to a microcomputer. In this manner, the decoder is able to accurately generate the data symbols even when the voltage offset of the received radio frequency signal varies. In conventional radio communication devices, on the other hand, the thresholds utilized for generation of data symbols are pre-programmed and unable to change. As a result, when the voltage offset of the carrier is great enough, the data symbols may be generated incorrectly.

It may be appreciated by now that there has been provided a method and apparatus for dynamically varying the thresholds in accordance with which data symbols are generated in response to variations in the voltage offset of a received radio frequency signal.

We claim:

1. A method for generating data symbols from a received signal having multiple signal voltages, the method comprising the steps of:

tracking signal voltages of the received signal to determine peak and valley values associated with high and low voltages, respectively, of the received signal;

summing the peak and valley values to result in a first sum value;

dividing the first sum value by four to generate integer and remainder values;

providing a first predetermined output when the remainder value is greater than a comparator number and a second predetermined output when the remainder value is not greater than the comparator number;

adding the integer value, a predetermined offset value, and a generated one of the first and second predetermined outputs to result in a second sum value;

calculating upper, center, and lower thresholds of the received signal in accordance with the second sum value, wherein the upper, center, and lower thresholds define four ranges of values;

deciding which of the four ranges of values encompasses a received signal voltage; and generating, in response to the deciding step, one of four possible data symbols.

2. The method according to claim 1, wherein the generating step comprises the steps of:

generating a first of the four possible data symbols when the received signal voltage is determined to be less than the lower threshold;

generating a second of the four possible data symbols when the received signal voltage is determined to be greater than the lower threshold and less than the center threshold;

generating a third of the four possible data symbols when the received signal voltage is determined to be greater than the center threshold and less than the upper threshold; and generating a fourth of the four possible data symbols when the received signal voltage is determined to be greater than the upper threshold.

3. The method according to claim 1, wherein calculation of the center threshold comprises the steps of:

adding the peak and valley values to result in a third sum value; and dividing the third sum value by two to result in the center threshold.

4. The method according to claim 1, wherein calculation of the center threshold comprises the steps of:

adding the upper and lower thresholds to result in a third sum value; and dividing the third sum value by two to generate the center threshold.

5. The method according to claim 1, further comprising, prior to the summing step, the step of:

inverting the valley value.

6. The method according to claim 1, wherein calculation of the upper and lower thresholds comprises the steps of:

summing the peak value and the second sum value to result in the upper threshold; and adding the valley value and the second sum value to result in the lower threshold.

7. The method according to claim 6, further comprising the step of:

inverting the second sum value prior to summing the peak value and the second sum value.

8. A symbol detector for generating data symbols from a received signal having multiple signal voltages, the symbol detector comprising:

peak and valley counters for tracking signal voltages of the received signal to determine peak and valley values associated with high and low voltages, respectively, of the received signal;

a first summer for summing the peak and valley values to result in a first sum value;

a first divider coupled to the first summer for dividing the first sum value by four to generate integer and remainder values;

a comparator coupled to the first divider for providing first and second predetermined outputs, respectively, when the remainder value is greater than a comparator number and when the remainder value is not greater than the comparator number;

a second summer coupled to the comparator for summing the integer value, a predetermined offset value, and a generated one of the first and second predetermined outputs to result in a second sum value;

calculation circuitry coupled to the second summer for calculating upper, center, and lower thresholds of the received signal in accordance with the second sum value, wherein the upper, center, and lower thresholds define four ranges of values; and a decoder coupled to the calculation circuitry for generating the data symbols in accordance with the signal voltages and the upper, lower, and center thresholds.

9. The symbol detector according to claim 8, wherein the calculation circuitry comprises:

a third summer coupled to the second summer for adding the peak value and the second sum value to generate the upper threshold; and a fourth summer coupled to the second summer for adding the valley value and the second sum value to generate the lower threshold.

10. The symbol detector according to claim 9, wherein the calculation circuitry further comprises:

a fifth summer for adding the upper and lower thresholds to generate a third sum value; and a second divider for dividing the third sum value by two to generate the center threshold.

11. The symbol detector according to claim 9, wherein the calculation circuitry further comprises:

an inverter coupled between the second summer and the third summer for inverting the second sum value prior to its summation with the peak value.

12. The symbol detector according to claim 9, further comprising:

an inverter coupled between the valley counter and the first summer for inverting the valley value prior to its summation with the peak value.

13. The symbol detector according to claim 9, further comprising:

an analog-to-digital converter coupled to the peak and valley counters for converting the multiple signal voltages to digital values that are provided to the peak and valley counters.

14. A radio communication device for processing a received signal to recover information included therein, the radio communication device comprising:

a receiver for demodulating the received signal to provide signal voltages therefrom;

a symbol detector coupled to the receiver for generating data symbols from the signal voltages provided thereto, the symbol detector comprising:

peak and valley counters for tracking the signal voltages to determine peak and valley values associated with high and low voltages, respectively, of the received signal;

a first summer for summing the peak and valley values to result in a first sum value;

a first divider coupled to the first summer for dividing the first sum value by four to generate integer and remainder values;

a comparator coupled to the first divider for providing first and second predetermined outputs, respectively, when the remainder value is greater than a comparator number and when the remainder value is not greater than the comparator number;

a second summer coupled to the comparator for summing the integer value, a predetermined offset value, and a generated one of the first and second predetermined outputs to result in a second sum value;

calculation means coupled to the second summer for calculating upper, center, and lower thresholds of the received signal in accordance with the second sum value, wherein the upper, center, and lower thresholds define four ranges of values; and a decoder coupled to the calculation means for generating the data symbols in accordance with the signal voltages and the upper, lower, and center thresholds; and a processor coupled to the symbol detector for receiving the data symbols and recovering therefrom the information included in the received signal.

15. The radio communication device according to claim 14, wherein the calculation means comprises:

a third summer coupled to the second summer for adding the peak value and the second sum value to generate the upper threshold; and a fourth summer coupled to the second summer for adding the valley value and the second sum value to generate the lower threshold.

16. The radio communication device according to claim 15, wherein the calculation means further comprises:

a fifth summer for adding the upper and lower thresholds to generate a third sum value; and a second divider for dividing the third sum value by two to generate the center threshold.

17. The radio communication device according to claim 15, wherein the calculation means further comprises:

an inverter coupled between the second summer and the third summer for inverting the second sum value prior to its summation with the peak value.

18. The radio communication device according to claim 15, further comprising:

an inverter coupled between the valley counter and the first summer for inverting the valley value prior to its summation with the peak value.

19. The radio communication device according to claim 15, further comprising:

an analog-to-digital converter coupled to the peak and valley counters for converting the signal voltages to digital values that are provided to the peak and valley counters.

* * * * *